(12) United States Patent  (10) Patent No.: US 8,230,403 B2
Albert et al.  (45) Date of Patent: *Jul. 24, 2012

(54) TYPED-DATA TRANSLATION FOR PLATFORM INDEPENDENCE

(75) Inventors: Eric Albert, Santa Clara, CA (US); Alexei Elias Kosut, Mountain View, CA (US); Matthew George Watson, San Bruno, CA (US); Steve Zellers, Brookdale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/953,518

(22) Filed: Nov. 24, 2010

(65) Prior Publication Data

US 2011/0138370 A1 Jun. 9, 2011

Related U.S. Application Data

(63) Continuation of application No. 11/144,877, filed on Jun. 3, 2005, now Pat. No. 7,865,884.

(51) Int. Cl.
 *G06F 9/45* (2006.01)
 *G06F 12/00* (2006.01)
(52) U.S. Cl. .............................. 717/136; 717/140; 711/1
(58) Field of Classification Search ........................ None
 See application file for complete search history.

(56) References Cited

U.S. PATENT DOCUMENTS

| | | | |
|---|---|---|---|
| 5,819,283 A | 10/1998 | Turkowski | |
| 5,828,884 A | 10/1998 | Lee et al. | |
| 5,995,080 A | 11/1999 | Biro et al. | |
| 6,021,275 A | 2/2000 | Horwat | |
| 6,131,185 A | 10/2000 | Coskun et al. | |
| 6,230,310 B1 | 5/2001 | Arrouye et al. | |
| 6,341,345 B1 | 1/2002 | Auslander et al. | |
| 6,434,625 B1 | 8/2002 | Loen | |
| 6,523,172 B1 * | 2/2003 | Martinez-Guerra et al. | . 717/143 |
| 6,578,193 B1 | 6/2003 | Adams | |
| 6,691,307 B2 | 2/2004 | Long | |
| 6,865,638 B1 | 3/2005 | Chatterjee | |
| 6,976,249 B1 | 12/2005 | Stattenfield | |
| 7,865,884 B1 * | 1/2011 | Albert et al. | ................... 717/140 |
| 2005/0235269 A1 * | 10/2005 | K N et al. | ..................... 717/136 |

OTHER PUBLICATIONS

"Apple Event Manager Reference." Apple Computer, Inc. Copyright 1993, 2005. pp. 1-230.
"Open Scripting Architecture Reference." Apple Computer, Inc. Copyright 1993, 2005. pp. 1-114.
"Resource Manager Reference." Apple Computer, Inc. Copyright 2001, 2005. pp. 1-78.
"Pasteboard Manager Programming Guide." Apple Computer, Inc. Copyright 2004. pp. 1-34.
"ONC+ Developer's Guide." Sun Microsystems, Inc. Copyright 1994-2005. http://docs.sun.com/app/docs/dpc/816-1435/6m7rrfn9c?a=view. Accessed May 9, 2005.

* cited by examiner

*Primary Examiner* — S. Sough
*Assistant Examiner* — Phuong Hoang
(74) *Attorney, Agent, or Firm* — Wong, Cabello, Lutsch, Rutherford & Brucculeri, LLP

(57) ABSTRACT

A method, computer program and device for the translation of typed data objects in a heterogeneous computational environment is described. The operating system (or installed shared code libraries) translates typed data objects from a first format (e.g., big-endian) to a second format (e.g., little-endian) if the application sending the object and the application receiving the object utilize different formats. By placing data object format translation capabilities into the operating system, the software development effort required to permit an application (e.g., a user-level application) to execute in a heterogeneous environment is significantly reduced.

22 Claims, 7 Drawing Sheets

TYPED-DATA TRANSLATION FOR PLATFORM INDEPENDENCE

CROSS REFERENCE TO RELATED APPLICATIONS

This is a continuation of and claims priority to U.S. patent application Ser. No. 11/144,877, now U.S. Pat. No. 7,865,884, entitled "Typed-Data Translation for Platform Independence" filed 3 Jun. 2005 by Eric Albert, Alexei Kosut, Matt Watson and Steve Zellers which is hereby incorporated by reference in its entirety.

BACKGROUND

When data are represented by multiple bytes, there is no unique way to order them. Accordingly, any order used is subject to arbitrary convention, called "endianness." The two main types of endianness are known as big-endian and little-endian. In big-endian format, the order of bytes in a word is such that the most significant byte is placed left-most in the word structure, the way humans deal with normal arithmetic (left to right). In contrast, little-endian format places the least significant byte leftmost in the word structure. Little-endian format is organized for the required processing order, since numbers are calculated by a processor starting with the least significant (left-most) digits. Most RISC-based processors use big-endian byte order while most processors manufactured by the Intel Corporation use little-endian byte order.

In a computational environment that permits both big-endian and little-endian formats to coexist, any time typed data objects are written to a file, transferred between different platforms or shared between different applications within a single system, the byte order or endianness of the data comprising the object must be taken into account. Otherwise, the same binary data residing on disk or in memory looks different to each type of program: little-endian programs look to the last byte for the most significant bit; big-endian programs look to the first byte for the most significant bit. As used herein, a typed data object is a multi-byte data structure having one or more fields wherein each field is defined by type (e.g., floating point, "line," "polygon" or "widget"). Illustrative typed data objects include, but are not limited to, files, multi-byte records within a file, multi-byte operating system data structures and multi-byte user and application-defined data structures. It will be recognized that a typed data object cannot be converted from one byte-ordering convention to another simply by swapping all the object's bytes.

To change byte ordering, programs are typically recompiled. Recompiling a program permits the resulting executable code to be run or executed on different endian-based platforms. Recompiling a program does not, however, address the problem of how to translate typed data objects from a first byte ordering to a second byte ordering. In the past, to compensate for system or program-specific typed data object formats between different endian-based platforms, application developers expended significant amounts of time and effort to recode their applications and/or to encode within each object an explicit description of the object so it could be converted by another application or function.

Accordingly, it would be beneficial to provide methods, devices and systems to translate typed data objects from one format to a second format in an application independent and developer-transparent manner.

SUMMARY

In one embodiment, the invention provides an method to translate typed data objects from a first format to a second format. The method includes receiving a typed data object in a first format, selecting a routine based on a characteristic of the typed data object and translating the typed data object into a second format using the selected routine. For example, routine selection may be made in response to interrogating the received typed data object or it may be made based on a message requesting the typed data object. Typed data object translation in accordance with the invention may be provided by an operating system component or a shared library (or libraries) installed and accessible to applications executing within an operating system (e.g., a software developers kit, SDK).

In another embodiment, the invention provides an operating system method to translate typed data objects from a first format to a second format in the context of a point-to-point communication. The method includes: receiving, by an operating system component (e.g., an event manager component), a typed data object having a first format (e.g., big-endian) from a first application and identifying a second application, the second application associated with a second format (e.g., little-endian); translating the typed data object from the first format to the second format; and sending the translated typed data object to the second application.

In yet another embodiment, the invention provides an operating centric method to translate typed data objects in the context of inter-application communication using generic message passing techniques (e.g., message or pasteboard components of an operating system). The method includes: receiving a typed data object having a first format (e.g., big-endian) from a first application; storing a token in an operating system defined memory location identifying the received typed data object (e.g., a pasteboard memory); receiving a request for the typed data object in a second format (e.g., little-endian); translating the received typed data object into the second format; updating the token to identify the translated typed data object so that the token identifies both the received typed data object and the translated typed data object; and sending the translated typed data object to the second application.

In still another embodiment, the invention provides a data structure for use by a software routine that has a field for identifying a plurality of versions of a typed data object—one version for each format the typed data object can assume.

Methods in accordance with the various embodiments of the invention may be stored in any media that is readable and executable by a computer system.

DETAILED DESCRIPTION

The following embodiments of the invention, described in terms of application programming interfaces ("APIs") executing in a Mac OS® operating system environment, are presented to enable any person skilled in the art to make and use the invention as claimed and are provided in the context of the particular examples discussed below, variations of which will be readily apparent to those skilled in the art. Accordingly, the claims appended hereto are not intended to be limited by the disclosed embodiments, but are to be accorded their widest scope consistent with the principles and features disclosed herein. (MAC OS is a registered trademark of Apple Computer, Inc. of Cupertino, Calif.)

Figure 1:
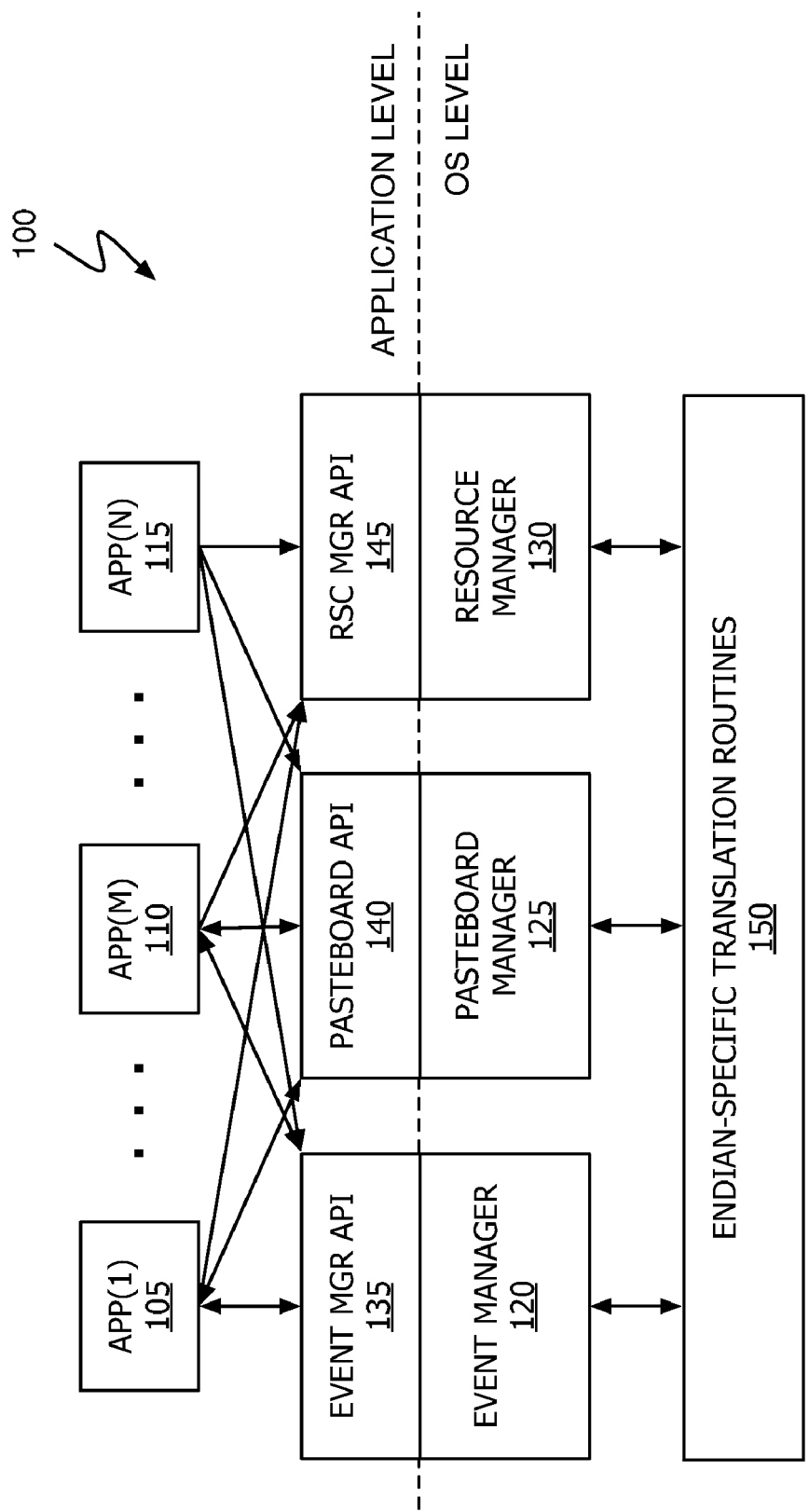
FIG. 1 shows, in block diagram form, a software architecture for translating typed data objects in accordance with one embodiment of the invention.

Referring to FIG. 1, software architecture 100 in accordance with one embodiment of the invention permits user-level applications 105-115 to communicate with operating system ("OS") level Event Manager 120, Pasteboard Manager 125 and Resource Manager 130 through public APIs, 135, 140 and 145 respectively. Illustrative user-level applications include iCal®, Safari, Pages and Address Book from Apple Computer. (ICAL is a registered trademarks of Apple Computer, Inc. of Cupertino, Calif.) It will be appreciated by software developers familiar with the Mac OS operating environment that Event Manager 120, Pasteboard Manager 125 and Resource Manager 130 are OS components that provide services to applications. Event Manager 120 (and API 135), for example, provide facilities for applications to send and respond to programmatic and user-initiated events or messages (intra-application and inter-application messages/events) such as, for example, "Apple events". Apple events, in turn, are a type of interprocess message that can specify complex operations and data. Applications typically use Apple events to request services and information from other applications or to provide services and information in response to such requests. Pasteboard Manager 125 (and API 140) provides a standardized mechanism for the asynchronous exchange of data within or between applications using pasteboards. For example, when a user selects data in a first application and chooses the "Copy" or "Cut" command, the selected data is placed into a pasteboard. When the user subsequently chooses the "Paste" command, the data in the pasteboard is copied to the currently active application. Resource Manager 130 (and API 145) provides an established mechanism for applications to create, delete, open, read, modify and write resources. In the Apple OS environment, a resource is data of any kind stored in a defined format and are usually contained in the files that make up the application distribution. Applications typically use resources to store descriptions of user interface elements such as menus, windows, controls, dialog boxes, icons as well as variable setting values such as the location of a window at the time a user closes the window.

When using Event Manager 120, Pasteboard Manager 125 or Resource Manager 130 the data content or payload communicated within or between applications is typically one or more typed data objects, some of which may be very complex (some typed data objects may, in fact, not be representable by high-level languages such as "C"). In a heterogeneous computing environment in which both big-endian and little-endian formats are permitted, there must be a mechanism to ensure that the format of a typed data object supplied by a sending application is in a format acceptable to the receiving application—even if the sending and receiving application are the same. In the prior art, the responsibility for translating a typed data object from a first format to a second format belonged to the application. This approach has at least two major drawbacks. First, it requires software developers whose applications are to execute in a heterogeneous environment to develop, debug and update their applications so that they can translate all typed data objects—those provided and defined by the underlying OS as well as those unique to the application. Second, because the receiving application may not be initially known (e.g., at the time application 110 places a typed data object into a pasteboard via Pasteboard Manager 125 and Pasteboard API 140, it does not know which, if any, application will retrieve the object and, therefore, what the final format of the object need be), all typed data objects would normally be transferred via a canonical or intermediate format and/or translation "promises." It will be recognized that the former approach may incur significant wasted overhead while the latter approach can involve significant security and/or computational problems.

Referring again to FIG. 1, in one embodiment of the invention endian-specific translation routines 150 are provided to Event Manager 120, Pasteboard Manager 125 and Resource Manager 130 to translate, as needed, OS defined typed data objects. In the context of Mac OS X, Table 1 provides an illustrative list of system-defined typed data objects for which endian-specific translation routines 150 have been generated. (Specifics of each type of data object may be obtained from the Developers web site provided free by Apple Computer, Inc. See, for example, http://developer.apple.com/ for more information.)

TABLE 1

Illustrative Mac OS Typed Data Objects

| MachineLocation | RGBColor | LongDateTime |
| LongFixed | FixedPoint | FixedRectangle |
| SInt16 | SInt32 | UInt32 |
| SInt64 | IEEE32BitFloatingPoint | IEEE64BitFloatingPoint |
| FSS | QDRectangle | ProcessSerialNumber |
| QDPoint | Arc | UnicodeText |
| aeut | aedt | ScrapStyles |
| BNDL | FREF | open |
| vers | CURS | acur |
| crsr | pNot | clut |
| CDCI | thng | THGA |
| thnr | thnd | scsz |
| STR# | styl | fttl |
| cltn | flac | stg# |
| stgp | drag | ldes |
| tab__ | cctb | CNTL |
| ALRT | DITL | DLOG |
| alrx | dlgx | dftb |
| wctb | WIND | MENU |

TABLE 1-continued

Illustrative Mac OS Typed Data Objects

| MBAR | mctb | xmnu |
|------|------|------|
| MENA | isr2 | isrv |
| cicn | itlk | KCHR |
| KCAP | itl0 | itl1 |
| itlb | itlc | itlm |
| SIZE | fssP | txtn |
| Mcmd | RidL | RID_ |

Figure 2:
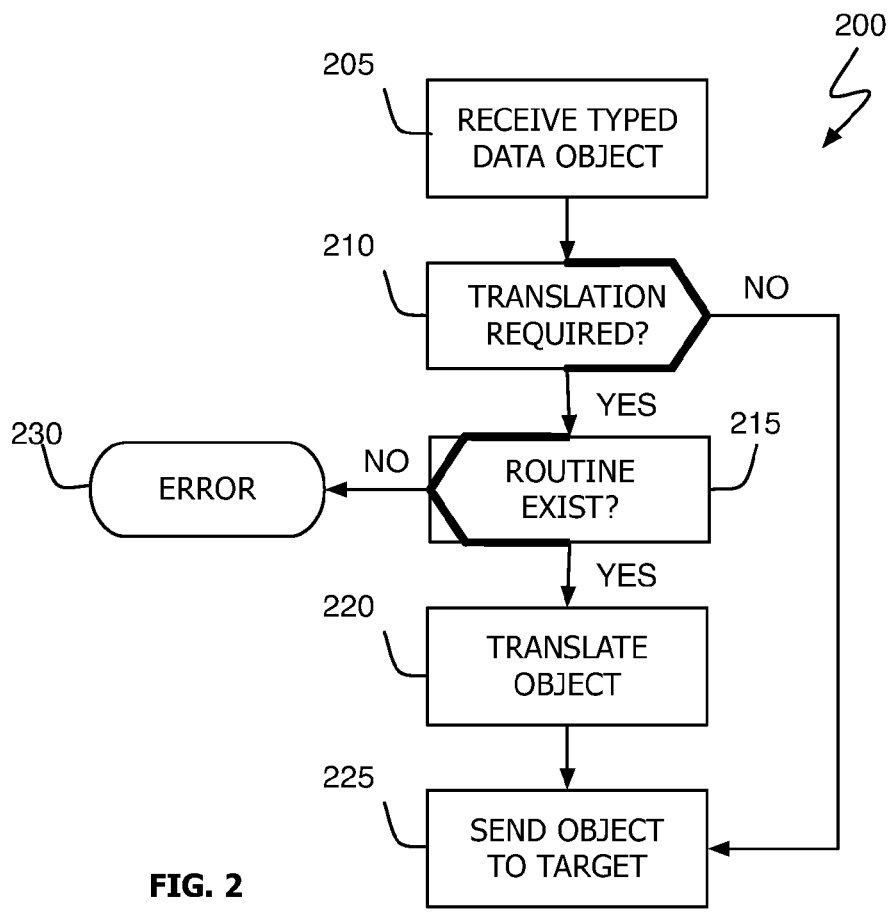
FIG. 2 shows, in flowchart form, an event object translation process in accordance with one embodiment of the invention.

In the context of an event processed through Event Manager 120, both the source and target application are known. That is, events are point-to-point operations where both the application supplying a typed data object and the application receiving the typed data object are known. Referring to FIG. 2, event object translation process 200 in accordance with one embodiment of the invention begins when Event Manager 120 receives a typed data object from a source application (block 205). Next, Event Manager 120 interrogates the object to determine if the object needs to be translated to conform to the format required by the target application (block 210). If the object requires translation (the "YES" prong of block 210) and an endian-specific translation routine 150 exists for the object (the "YES" prong of block 215), the object is translated (block 220) and sent to the target application (block 225). If the object requires translation (the "YES" prong of block 210) and no endian-specific translation routine 150 exists (the "NO" prong of block 215), error processing is initiated (block 230). Finally, if the source and the target application utilize the same format (the "NO" prong of block 210) no translation is needed and the object is sent directly to the target application (block 225).

Figure 3:
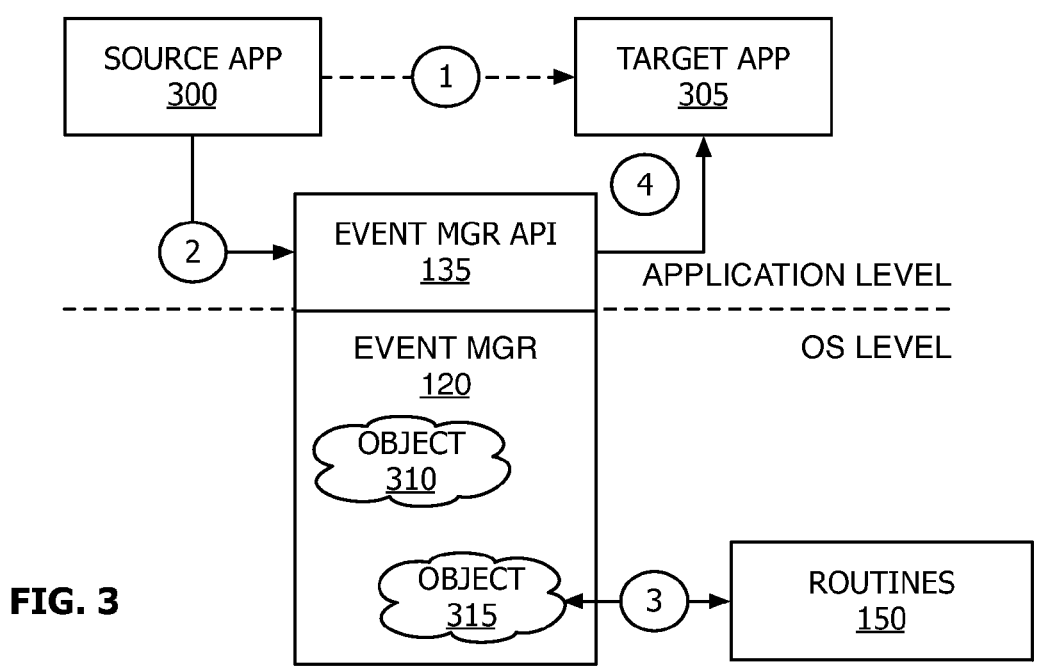
FIG. 3 shows, in block diagram form, a data flow diagram in accordance with one embodiment of the invention corresponding to FIG. 2.

A data flow diagram corresponding to the acts of FIG. 2 is shown in FIG. 3. As in FIG. 2, the goal is for source application 300 to send a typed data object to target application 305 (←). Initially, source application 300 sends typed data object 310 to Event Manager 120 via Event Manager API 135 (↑). Assuming source application 300 and target application 305 use different formats and a translation routine exists (see blocks 210 and 215 of FIG. 2), Event Manager 120 employs one or more routines 150 to generate translated object 315 (→). Translated object 315 is then sent to target application 305 via Event Manager API 135 (↓).

In contrast to the point-to-point operations of Event Manager 120, when a typed data object is placed into a pasteboard via Pasteboard Manager 125, the target application is unknown. Accordingly, in a heterogeneous environment the required format of a pasteboard object is unknown until such time as the object is retrieved by a second application. One way to address this ambiguity is to place all objects into a pasteboard in a canonical format—requiring the target application to translate all objects from this predetermined (canonical) format to the particular format needed by the application. Another way to address this ambiguity is to translate objects into each of the specified formats (e.g., big-endian and little-endian) at the time the object is placed into the pasteboard. Yet another way to address this ambiguity is to modify an object's pasteboard token (that entity retained in a pasteboard that represents the object) to account for the different possible formats, updating the token to reflect the available formats as they are generated. While potentially useful, both of the first two approaches identified here can involve significant computational overhead in that multiple translations may be required even if the source and target applications use the same format. Thus, while each of these methods may use routines 150 in accordance with the invention, the "modified token" approach will be described in more detail here.

Figure 4:
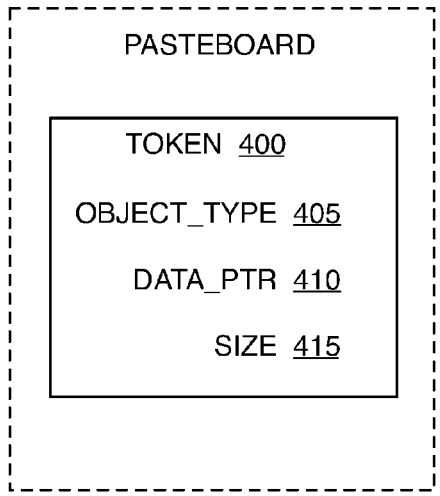
FIG. 4 shows, in block diagram form, the structure of a prior art pasteboard token.
Figure 5:
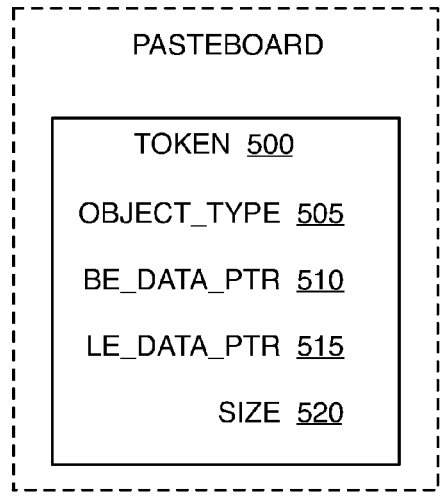
FIG. 5 shows, in block diagram form, the structure of a pasteboard token in accordance with one embodiment of the invention.

As noted above, in many modern operating system environments "placing" a typed data object into a pasteboard means storing a token representing the object in the pasteboard. Referring to FIG. 4, for example, prior art pasteboard token 400 comprises object type identifier 405 (e.g., identifying the object as a polygon), data pointer 410 (pointing to memory in which the data object is stored) and size indicator 415 (indicating the size, typically in bytes, of the data object). In accordance with one embodiment of the invention, pasteboard tokens comprise additional fields—one for each type of format an object may assume. Referring to FIG. 5, for example, in a heterogeneous environment where an object may assume a big-endian or little-endian format, token 500 comprises object type identifier 505 (see discussion above regarding element 405), size indicator 520 (see discussion above regarding element 415), big-endian data pointer 510 and little-endian data pointer 515. As described in more detail below, each of big-endian data pointer 510 and little-endian data pointer 515 may point to memory containing a typed data object having the specified format (big-endian or little-endian), or they may contain a NOT_IN_USE value. A NOT_IN_USE value indicates that the object has not yet been translated—that is, there is no representation of the object in memory corresponding to the data pointer's associated format.

Figure 6:
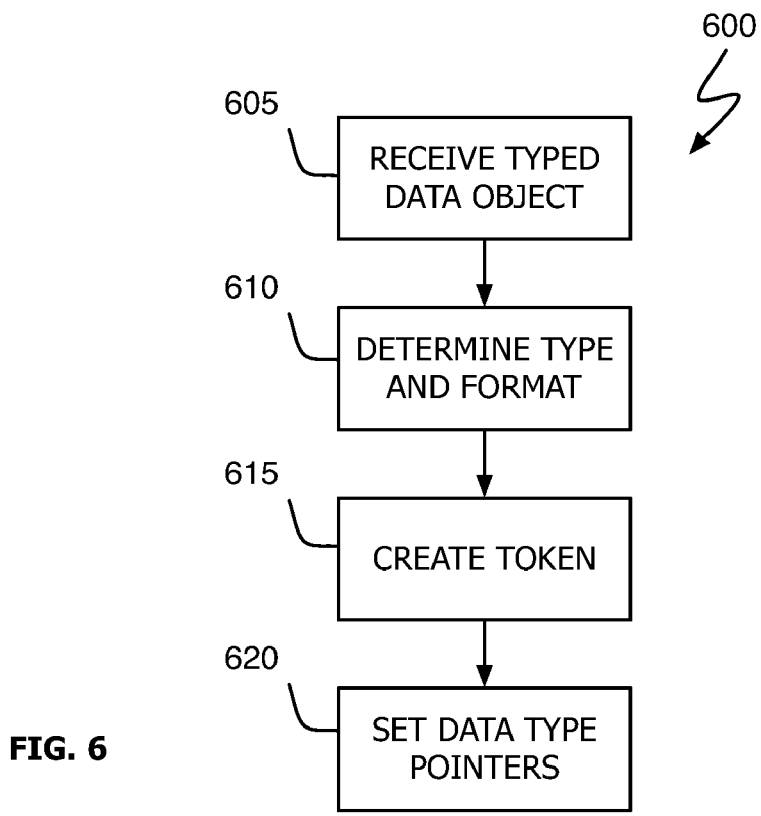
FIG. 6 shows, in flowchart form, a pasteboard input operation in accordance with one embodiment of the invention.

Referring to FIG. 6, pasteboard input procedure 600 in accordance with one embodiment of the invention begins when Pasteboard Manager 125 (via Pasteboard API 140) receives a typed data object (block 605). Next, Pasteboard Manager 125 determines the object's type and format (block 610), creates a pasteboard token representing the object (block 615) and updates the token's descriptive fields (block 620). Specifically, the token's data pointer corresponding to the object's determined format is set to point to the object (e.g., BE_DATA_PTR field 510) and the other token data pointer (e.g., LE_DATA_PTR field 515) is set to the NOT_IN_USE value.

Figure 7:
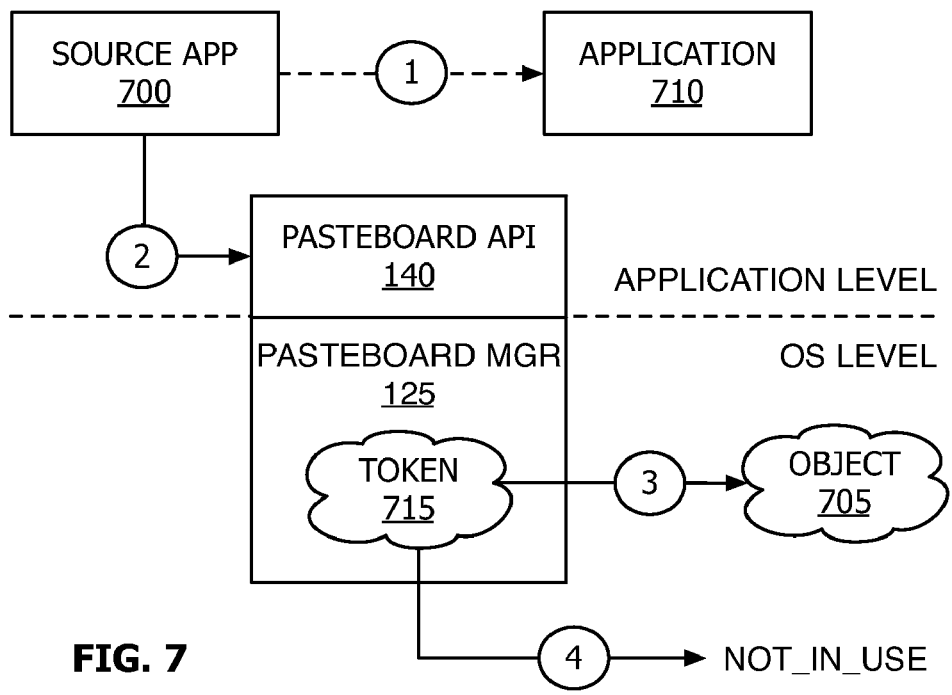
FIG. 7 shows, in block diagram form, a data flow diagram in accordance with one embodiment of the invention corresponding to FIG. 6.

A data flow diagram corresponding to the acts of FIG. 6 is shown in FIG. 7. As in FIG. 6, the goal is for source application 700 to place object 705 into a pasteboard so that at some arbitrary later time application 710 may retrieve it (←). Initially, source application 700 places object 705 into the pasteboard via Pasteboard API 140 (↑). As previously noted, this results in token 715 being placed into the pasteboard by Pasteboard Manager 125. Assuming object 705 is a big-endian formatted object, token 715's big-endian data pointer (see 510 in FIG. 5) is set to point to the object (→) and 715's little-endian data pointer (see 515 in FIG. 5) is set to a NOT_IN_USE value (↓).

Figure 8:
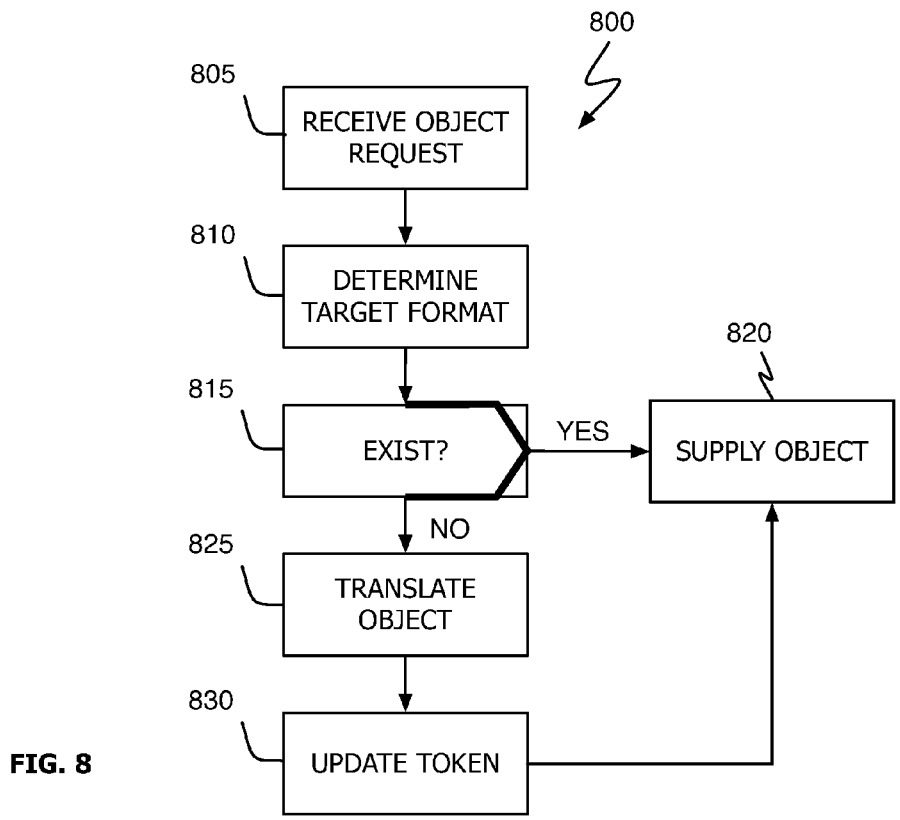
FIG. 8 shows, in flowchart form, a pasteboard output operation in accordance with one embodiment of the invention.

Referring to FIG. 8, pasteboard output procedure 800 in accordance with one embodiment of the invention begins when Pasteboard Manager 125 (via Pasteboard API 140) receives a request for a previously input object (block 805). Next, Pasteboard Manager 125 determines the format required by the requesting application (block 810). If the data object in the required format exists (the "YES" prong of block 815), the object is supplied to the requesting application (block 820). If the data object in the required format does not exist (the "NO" prong of block 815), the data object is translated to the required format using endian-specific routines 150 (block 825) and the appropriate pasteboard token data pointer field is updated to point to the newly translated object (block 830). In one embodiment, the existence of the data object is determined by looking to the pasteboard token's data pointer fields. For example, if the target format is little-endian and the pasteboard token's LE_DATA_PTR field 515 value is NOT_IN_USE, then a little-endian version of the typed data object does not yet exist. On the other hand, if the pasteboard token's LE_DATA_PTR field 515 value is not NOT_IN_USE, then a little-endian version of the typed data object does exist and it can be found at the location specified by LE_DATA_PTR field 515.

Figure 9:
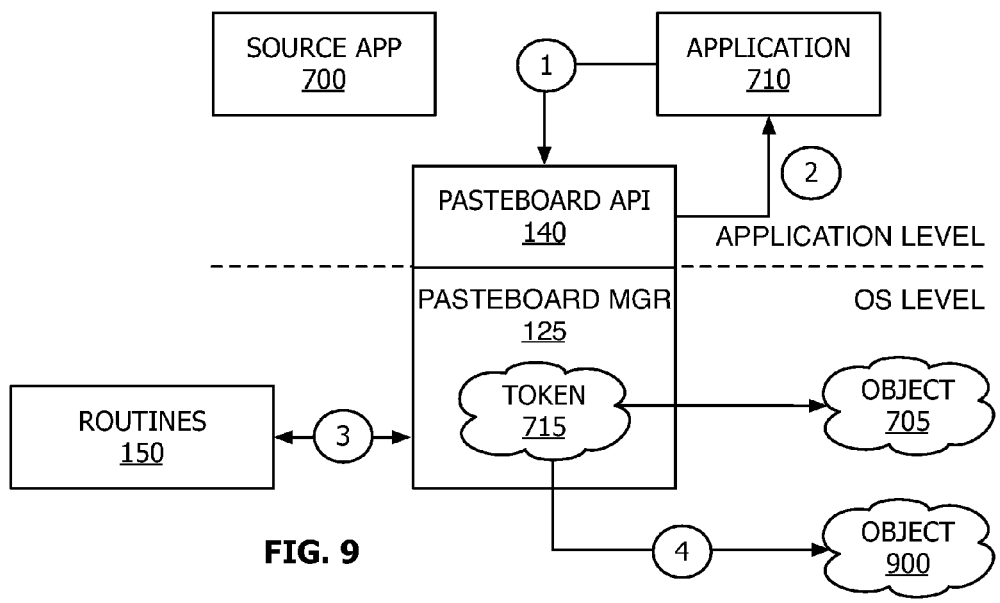
FIG. 9 shows, in block diagram form, a data flow diagram in accordance with one embodiment of the invention corresponding to FIG. 8.

A data flow diagram corresponding to the acts of FIG. 8 is shown in FIG. 9. Initially, arbitrary application 710 makes a request for an object stored in the pasteboard (←). If the object exists in the format required by application 710, it is simply delivered via Pasteboard API 140 (↑). If the object does not exist in the required format, Pasteboard Manager 125 uses endian-specific routines 150 (→) to translate object 705 into the required format, object 900 (↓), and token 715's data pointer is updated to point to object 900. The properly formatted object is then provided to arbitrary application 710 via Pasteboard API 140 (↑). As shown in FIG. 9, two copies of the object are now available through token 715.

In the context of resource management via Resource Manager 130, typed data objects stored in a resource file (or the resource fork of a file) are generally in a known format. In addition, the format required by the application accessing and/or manipulating the resource is known. However, in a heterogeneous environment in which a first application using a first format (e.g., big-endian) must obtain or exchange resource information with a second application using a second format (e.g., little-endian), or where a first application using a first format must interact with legacy or pre-existing resources in a second format, a need to convert between different formats exists. In the past, the application's developer was responsible for redesigning their software to accommodate the differing resource formats. In accordance with the invention, however, Resource Manager 130 and endian-specific routines 150 may be used to seamlessly translate between the various formats.

Figure 10:
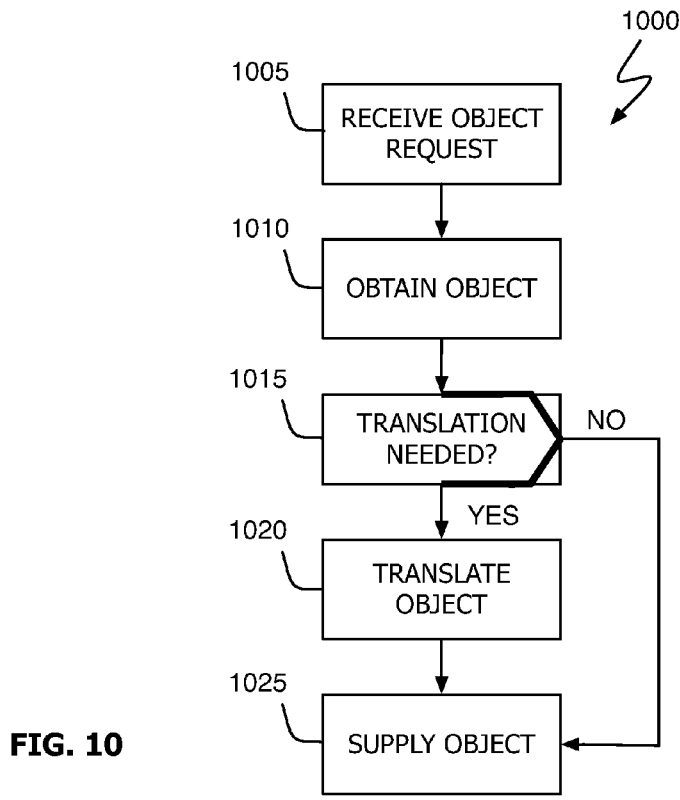
FIG. 10 shows, in flowchart form, a resource manipulation operation in accordance with one embodiment of the invention.

Referring to FIG. 10, resource object translation process 1000 in accordance with one embodiment of the invention begins when Resource Manager 130 receives a request to retrieve (or write or modify) a specified resource object (block 1005). In response, Resource Manager 130 obtains the resource from a specified file (block 1010). If the format of the retrieved object is different from the format required by the requesting application (the "YES" prong of block 1015), Resource Manager 130 uses routines 150 to translate the object (block 1020). Resource Manager 130 then returns the translated object to the requesting application via Resource Manager API 145 (block 1025). If the format of the retrieved object's format is the same as that required by the requesting application (the "NO" prong of block 1015), the object is simply passed back in accordance with the acts of block 1025. One of ordinary skill in the art will recognize that resource object translation process 1000 is equally application to the acts of creating, writing and modifying resources.

Figure 11:
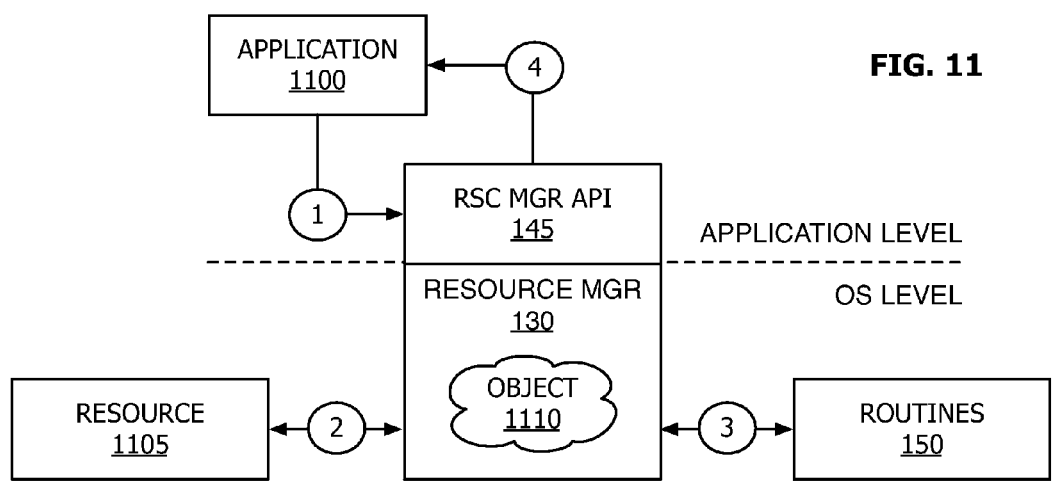
FIG. 11 shows, in block diagram form, a data flow diagram in accordance with one embodiment of the invention corresponding to FIG. 10.

A data flow diagram corresponding to the acts of FIG. 10 is shown in FIG. 11. Initially, application 1100 issues a request to retrieve a specified resource object via Resource Manager API 145 (←). In response, Resource Manager 130 acquires a copy of designated resource 1105 in the form of typed data object 1110 (↑). If the format of retrieved object 1110 differs from that required by requesting application 1100, routines 150 are used to translate the object into the proper format (→). Finally, translated object 1110 is supplied to application 1100 (↓).

Figure 12:
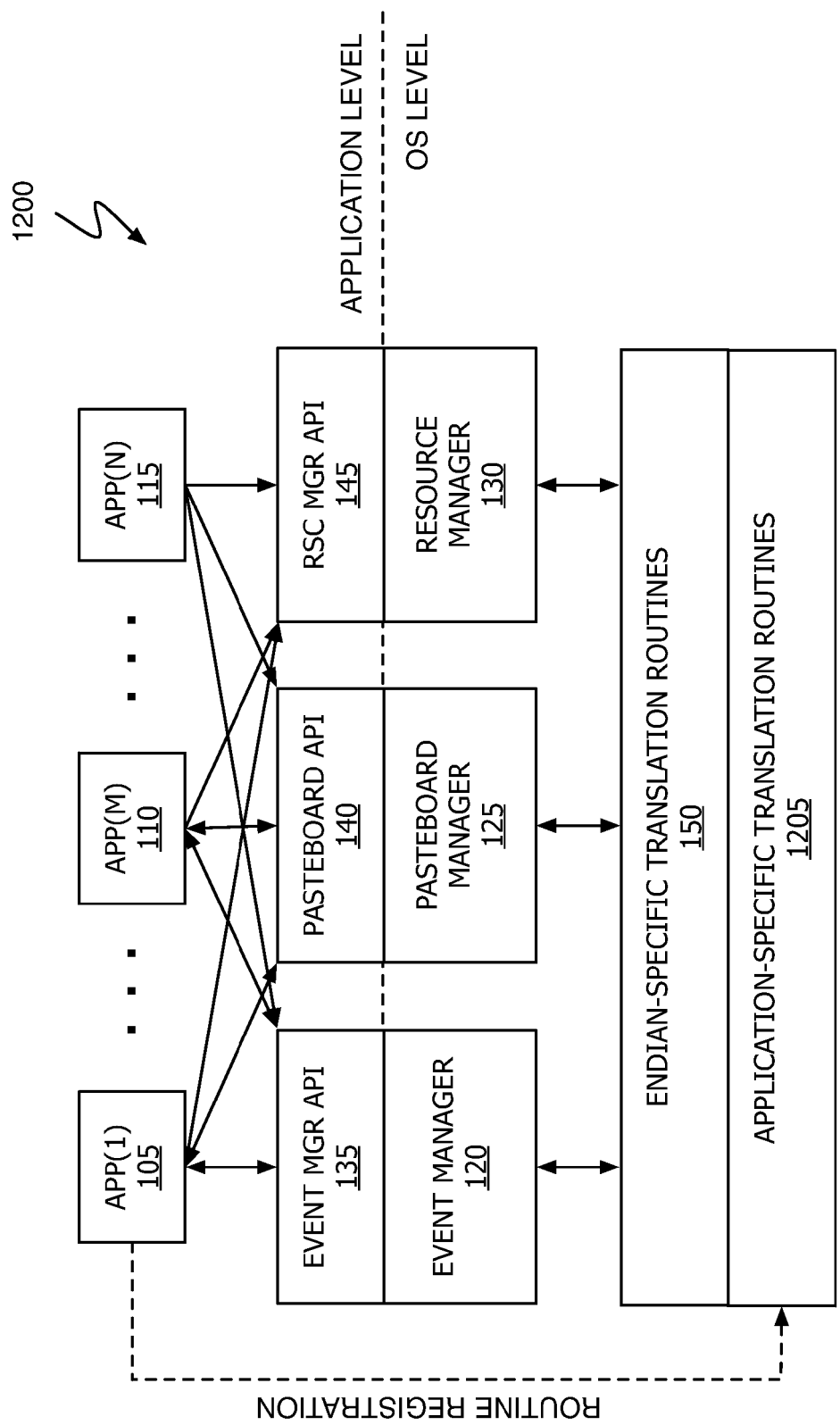
FIG. 12 shows, in block diagram form, a software architecture for translating typed data objects in accordance with a second embodiment of the invention.

As described so far, routines 150 have been used to translate OS defined typed data objects—that is, structures known, defined or provided by the OS within which applications execute. In another embodiment, applications may register their own translation routines. Referring to FIG. 12, software architecture 1200 in accordance with this embodiment of the invention permits user-level applications (e.g., application 105) to register translation routines 1205 with the OS. Once registered, such routines are treated in the same manner as system-defined translation routines 150 as far as the registering application is concerned. That is, in general if Application-1 registers a translation routine it will only be invoked by the OS (e.g., Event Manager 120, Pasteboard Manager 125 or Resource Manager 130) on behalf of that application. In another embodiment, however, an application could register a translation routine that could be accessed by other applications, including operating system components. It will be recognized that application-specific translation routines 1205 may be implemented in whatever language the application developer chooses, as long as it conforms to the calling conventions required by the operating system within which the application is to run. In the Mac OS environment, for example, this could be the Apple Binary Interface ("ABI") convention. It will also be recognized that routines 1205 may be delivered in any number of formats. For example, as a dynamically linked library ("D10") or a script file.

Figure 13:
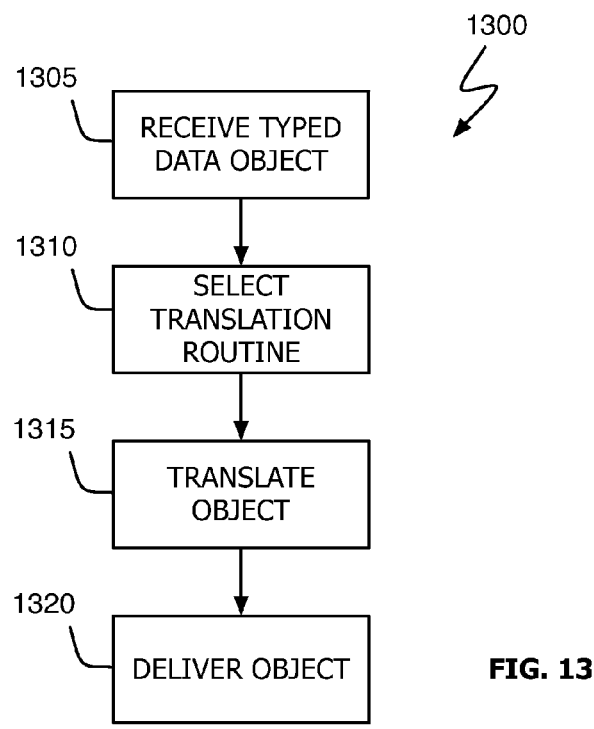
FIG. 13 shows, in flowchart form, an typed data object translation operation in accordance with another embodiment of the invention.

In summary, see FIG. 13, typed data object translation operation 1300 in accordance with the invention first receives a typed data object (block 1305) and then selects a translation routine based on the type of the typed data object (block 1310). The selected translation routine is used to translate the object from a first format such as big-endian, to a second format such as little-endian (block 1315). The translated object is then delivered to the appropriate location (block 1320). Illustrative "appropriate locations" include a flat file, a database or database record, memory associated with an application requesting the object or memory associated with an operating system component such as the pasteboard manager.

It will be recognized that if an object cannot be translated because a suitable translation routine does not exist in accordance with blocks 220 (FIG. 2), 825 (FIG. 8), 1020 (FIG. 10) or 1315 (FIG. 13), the operating system (e.g., Event Manager 120, Pasteboard Manager 125 or Resource Manager 130) may elect to take one of the following actions: (1) refuse to provide the requested data; (2) provide the data in whatever format it has without concern or guarantee of the data's validity at the target application; (3) generate an error condition; (4) request the application that supplied the typed data object to translate it; or (5) request the application that supplied the typed data object register a routine (see discussion above) to translate the routine.

One benefit of implementing typed data object translation services using OS components (e.g., Event Manager 120, Pasteboard Manager 125 or Resource Manager 130) in accordance with the invention is that it eliminates the need for individual developers to develop, code and debug translation routines for those typed data objects covered by routines 150. As used herein, an OS component could be an application or function module that is part of an operating system or a shared library (or libraries) installed and accessible to applications executing within an operating system (e.g., a software developers kit, SDK).

Another benefit is that it permits continued function of applications when the underlying operating system's defined typed data objects have been changed or are no longer used by the OS. Yet another benefit of the invention is that the computational cost of translating typed data objects during pasteboard operations is deferred until needed. For example, if a little-endian object is placed into a pasteboard it will only be translated if a big-endian application requests it. And it will not be translated if only little-endian applications request it. Another benefit of pasteboard operations in accordance with the invention is that an object is only translated once for each requested but non-existent format. For example, in an operating environment in which only two formats are defined (e.g., big-endian and little-endian), each object is subject to translation in accordance with the invention at most once. In general, in an operating environment in which N formats are defined, each object is subject to at most (N–1) translations. Still another benefit of the invention is that it virtually eliminates the software development effort required to permit an application to manipulate system defined typed data objects in a heterogeneous operating environment. That is, a software developer creates and manipulates system defined typed data objects in exactly the same way regardless of what format her application requires—it is the OS in which the application executes, via routines 135 (see FIG. 1), that compensates for differently formatted objects. Still Another benefit of the invention is that it allows developers to "port" their applications from an environment based on a first format (e.g., big-endian) to an environment based on a second format (e.g., little-endian) by simply developing translation routines for those typed data objects unique to their application. As described with respect to FIG. 12, application-specific translation routines 1205 may be registered so that typed data objects used by a specific application may be translated for the benefit of other applications.

Various changes in the described system architectures and software elements, as well as in the details of the illustrated operational methods are possible without departing from the scope of the following claims. For instance, the principles and techniques described herein are applicable to operating systems other than the Mac OS—for example, the Windows® operating system. (WINDOWS is a registered trademark of the Microsoft Corporation of Redmond, Wash.) That is, modern operating systems other than Mac OS provide functionality similar to Event Manager, Pasteboard Manager and Resource Manager components described herein. In addition, acts in accordance with FIGS. 2, 3, 6-11 and 13 may be performed by a programmable control device executing instructions organized into one or more program modules. A programmable control device may be a single computer processor, a special purpose processor (e.g., a digital signal processor, "DSP"), a plurality of processors coupled by a communications link or a custom designed state machine. Custom designed state machines may be embodied in a hardware device such as an integrated circuit including, but not limited to, application specific integrated circuits ("ASICs") or field programmable gate array ("FPGAs"). Storage devices suitable for tangibly embodying program instructions include, but are not limited to: magnetic disks (fixed, floppy, and removable) and tape; optical media such as CD-ROMs and digital video disks ("DVDs"); and semiconductor memory devices such as Electrically Programmable Read-Only Memory ("EPROM"), Electrically Erasable Programmable Read-Only Memory ("EEPROM"), Programmable Gate Arrays and flash devices.

The invention claimed is:

1. A typed data object translation method, comprising:
   obtaining, from a first application, a typed data object having a first format with a first corresponding byte ordering;
   creating a token in an operating system specified memory identifying the received typed data object;
   receiving a request for the typed data object in a second format with a second corresponding byte ordering;
   translating the received typed data object into the second format;
   updating the token to identify the translated typed data object so that the token identifies both the received typed data object and the translated typed data object wherein the received typed data object remains in the first format and the translated typed data object is in the second format; and
   sending the translated typed data object to a second application wherein sending to the second application comprises sending the token.

2. The method of claim 1, wherein the first application and second application are user-level applications, and the second application registers a translation routine with an operating system component, the translation routine to convert the typed data object from the first format to the second format.

3. The method of claim 2, wherein the operating system component comprises an event manager component.

4. The method of claim 2, wherein the operating system component comprises one or more shared code libraries.

5. The method of claim 1, wherein the first application and second application are user-level applications, and the first application registers a translation routine with an operating system component, the translation routine to convert the typed data object from the first format to the second format.

6. The method of claim 5, wherein the operating system component comprises an event manager component.

7. The method of claim 5, wherein the operating system component comprises one or more shared code libraries.

8. The method of claim 1, wherein the first format comprises a big-endian format or a little-endian format.

9. A computer system, comprising:
   non-volatile storage coupled to a central processing unit;
   volatile storage coupled to the central processing unit;
   user-level applications, stored on the non-volatile storage;
   an operating system, stored on the non-volatile storage and comprising a plurality of functional components, wherein at least one of the plurality of components is configured to:
      obtain, from a first application, a typed data object having a first format with a first corresponding byte ordering;
      create a token in an operating system specified memory identifying the received typed data object;
      receive a request for the typed data object in a second format with a second corresponding byte ordering;
      translate the received typed data object into the second format;
      update the token to identify the translated typed data object so that the token identifies both the received typed data object and the translated typed data object wherein the received typed data object remains in the first format and the translated typed data object is in the second format; and
      send the translated typed data object to the a second application wherein sending to the second application comprises sending the token; and
   whereas the central processor unit is further configured to execute one or more of the user-level applications.

10. The computer system of claim 9, wherein the first application and second application are user-level applications, and the second application registers a translation routine with the operating system, the translation routine to convert the typed data object from the first format to the second format.

11. The computer system of claim 9, wherein the first application and second application are user-level applications, and the first application registers a translation routine with the operating system, the translation routine to convert the typed data object from the first format to the second format.

12. The computer system of claim 9, wherein the operating system comprises an event manager component.

13. The computer system of claim 9, wherein the operating system comprises one or more shared code libraries.

14. The computer system of claim 9, wherein the first format comprises a big-endian format or a little-endian format.

15. A program storage device, readable by a programmable control device, comprising instructions stored on the program storage device for causing the programmable control device to:
   obtain, from a first application, a typed data object having a first format with a first corresponding byte ordering;
   create a token in an operating system specified memory identifying the received typed data object;
   receive a request for the typed data object in a second format with a second corresponding byte ordering;
   translate the received typed data object into the second format;
   update the token to identify the translated typed data object so that the token identifies both the received typed data object and the translated typed data object wherein the received typed data object remains in the first format and the translated typed data object is in the second format; and
   send the translated typed data object to a second application wherein sending to the second application comprises sending the token.

16. The program storage device of claim 15, wherein the first application and second application are user-level applications, and the second application registers a translation routine with an operating system, the translation routine to convert the typed data object from the first format to the second format.

17. The program storage device of claim 16, wherein the operating system comprises an event manager component.

18. The program storage device of claim 16, wherein the operating system comprises one or more shared code libraries.

19. The program storage device of claim 15, wherein the first application and second application are user-level applications, and the first application registers a translation routine with an operating system, the translation routine to convert the typed data object from the first format to the second format.

20. The program storage device of claim 19, wherein the operating system comprises an event manager component.

21. The program storage device of claim 19, wherein the operating system comprises one or more shared code libraries.

22. The program storage device of claim 15, wherein the first format comprises a big-endian format or a little-endian format.

* * * * *

UNITED STATES PATENT AND TRADEMARK OFFICE
CERTIFICATE OF CORRECTION

PATENT NO. : 8,230,403 B2
APPLICATION NO. : 12/953518
DATED : July 24, 2012
INVENTOR(S) : Eric Albert et al.

It is certified that error appears in the above-identified patent and that said Letters Patent is hereby corrected as shown below:

In the Claims

Column 10, Line 55, Claim 9; replace:
"send the translated typed data object to the a second" with
-- send the translated typed data object to the second --

Signed and Sealed this
Twentieth Day of August, 2013

Teresa Stanek Rea
*Acting Director of the United States Patent and Trademark Office*